(12) United States Patent
Arbel et al.

(10) Patent No.: US 8,261,227 B2
(45) Date of Patent: Sep. 4, 2012

(54) CIRCUIT DESIGN APPROXIMATION

(75) Inventors: Eli Arbel, Haifa (IL); Oleg Rokhlenko, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 40 days.

(21) Appl. No.: 12/957,420

(22) Filed: Dec. 1, 2010

(65) Prior Publication Data

US 2012/0144352 A1 Jun. 7, 2012

(51) Int. Cl.
*G06F 17/50* (2006.01)
*G06F 9/455* (2006.01)

(52) U.S. Cl. ......... 716/132; 716/133; 716/134; 716/135

(58) Field of Classification Search .................. 716/132, 716/133, 134
See application file for complete search history.

(56) References Cited

U.S. PATENT DOCUMENTS

| 6,792,581 | B2 | 9/2004 | Moondanos et al. | |
| 2008/0301593 | A1 | 12/2008 | Jiange et al. | |
| 2008/0301594 | A1* | 12/2008 | Jiang et al. | 716/2 |
| 2009/0013289 | A1* | 1/2009 | Arbel et al. | 716/2 |

OTHER PUBLICATIONS

Xiushan Feng and Alan J. Hu, "Early Cutpoint Insertion for High-Level Software vs. RTL Formal Combinational Equivalence Verification", DAC 2006, Jul. 24-28, 2006, San Francisco, California, USA. Copyright 2006 ACM.

Andreas Kuehlmann and Florian Krohm, "Equivalence Checking Using Cuts and Heaps", IBM Thomas J. Watson Research Center. 1997 ACM.

Uwe Hinsgerger, Reiner Kolla, Thomas Kunjan, "Approximative Representation of Boolean Functions by Size Controllable ROBDD's", Sep. 1997.

Eli Arbel et al., "SAT-based synthesis of clock gating functions using 3-valued abstraction", IBM Haifa Research Labs 2009.

* cited by examiner

*Primary Examiner* — Vuthe Siek
*Assistant Examiner* — Brian Ngo
(74) *Attorney, Agent, or Firm* — Ziv Glazberg; G&A Glazberg Applbaum

(57) ABSTRACT

A circuit design, responsive the input signals, may be obtained and processed. The circuit design may define connections between combinational elements, memory elements, and input signals. Identification of cut-off points may be performed with respect to predetermined combinational logic input signals. The cut-off points may be connections whose values are not dependant on the value of the predetermined combinational logic input signals. An approximated circuit design may be synthesized by relaxing the logic associated with the cut-off points. Based on the approximated circuit design, processing may be performed. In some exemplary embodiments, a clock gating function of a memory element may be determined by approximating the circuit design with respect to the output signal of the memory element. The clock gating function may be determined based on the approximated circuit design and introduced to the circuit design, with or without additional refinement.

15 Claims, 5 Drawing Sheets

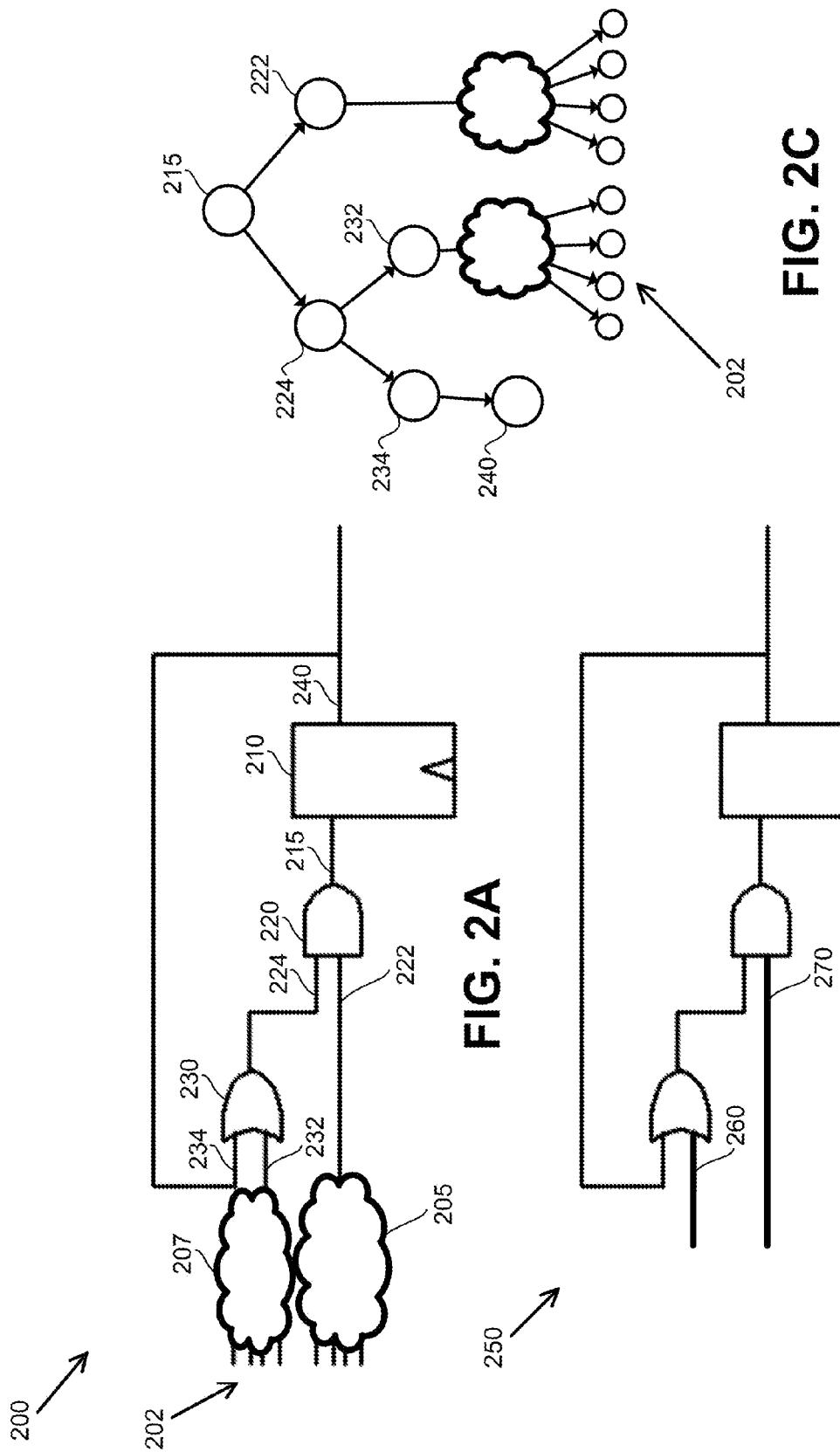

CIRCUIT DESIGN APPROXIMATION

TECHNICAL FIELD

The present disclosure relates to circuit design, in general, and to over-approximation of a circuit design useful for the design of the circuit, in particular.

BACKGROUND

When a circuit design is being designed, automatic or semi-automatic processes, such as determining a clock gating function to be used with respect to a memory element, such as for example a flip-flop or a latch, may be utilized. However, as the circuit design may include a large number of signals that are logically connected to each other by combinational logic, performing various computations may be a hard task.

Traditionally, a use of a Binary Decision Datagram (BDD) may be used to enable automatic simplification of complex binary functions represented by the signals of the circuit design. Another option is to represent the logic and a corresponding desired attribute as a Boolean Satisfaction Problem, and use a SAT solver to determine whether the attribute is satisfied of the logic. In some cases, an All-SAT may be used to determine a set of states in the design that hold the desired attribute. Though these approaches enable processing the circuit design, they do not scale well enough, and given design that has many memory units, input signals and/or complex combinational logic, the sizes of the BDDs may be too large to be retained in the memory of a computerized device and the SAT may not provide an answer within a reasonable time. These problems are an aspect of the state-space explosion problem which refers to the fact that the number of distinct states represented by such a circuit design is too high for a computerized device to process. As each signal multiplies the number of states, it can be understood that the size of the state space is exponential in the number of signals/memory units. Therefore, the state-space explosion problem may be a significant problem with regards to automatic or semi-automatic processing of the circuit design.

BRIEF SUMMARY OF THE INVENTION

One exemplary embodiment of the disclosed subject matter is a computer-implemented method performed by a processor, the method comprising: obtaining a circuit design, the circuit design is responsive to input signals, the circuit design defines connections between combinational elements, memory elements, and input signals; selecting one or more combinational logic input signals of the circuit design; identifying at least one cut-off point in the circuit design with respect to the selected combinational logic input signals, wherein value of the cut-off point is defined as a combinational function of a set of combinational logic input signals, the set of combinational logic input signals does not comprise any of the selected combinational logic input signals; and approximating the circuit design by defining an approximated circuit design, wherein the approximated circuit design is retained in a storage device, wherein in the approximated circuit design the at least one cut-off point is defined as a value of a new input signal.

Another exemplary embodiment of the disclosed subject matter is a computerized apparatus having a processor and a memory device, the computerized system comprising: a circuit design obtainer operative to obtain a circuit design, the circuit design is responsive to input signals, the circuit design defines connections between combinational elements, memory elements, and input signals; a combinational logic input signal selector operative to select one or more combinational logic input signals of the circuit design; a cut-off point identifier operative to identify at least one cut-off point in the circuit design with respect to the selected combinational logic input signals, wherein value of the cut-off point is defined as a combinational function of a set of combinational logic input signals, the set of combinational logic input signals does not comprise any of the selected combinational logic input signals; and a circuit design approximator operative to define an approximated circuit design based on the circuit design, wherein in the approximated circuit design the at least one cut-off point is connected to a simple input signal instead of to the combinational function to the input signals.

Yet another exemplary embodiment of the disclosed subject matter is a computer program product comprising: a non-transitory computer readable medium; a first program instruction for obtaining a circuit design, the circuit design is responsive to input signals, the circuit design defines connections between combinational elements, memory elements, and input signals; a second program instruction for selecting one or more combinational logic input signals of the circuit design; a third program instruction for identifying at least one cut-off point in the circuit design with respect to the selected combinational logic input signals, wherein value of the cut-off point is defined as a combinational function of a set of combinational logic input signals, the set of combinational logic input signals does not comprise any of the selected combinational logic input signals; a fourth program instruction for approximating the circuit design by defining an approximated circuit design, wherein the approximated circuit design is retained in a storage device, wherein in the approximated circuit design the at least one cut-off point is defined as a value of a new input signal; and wherein the first, second, third and fourth program instructions are stored on the non-transitory computer readable media.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings:

FIGS. 2A and 2B show a diagram of a circuit design and of a correlated approximated circuit design, in accordance with some exemplary embodiments of the disclosed subject matter;

FIG. 2C shows a corresponding Direct Acyclic Graph (DAG) data structure of the circuit design, in accordance with some exemplary embodiments of the disclosed subject matter;

DETAILED DESCRIPTION

Figure 1:
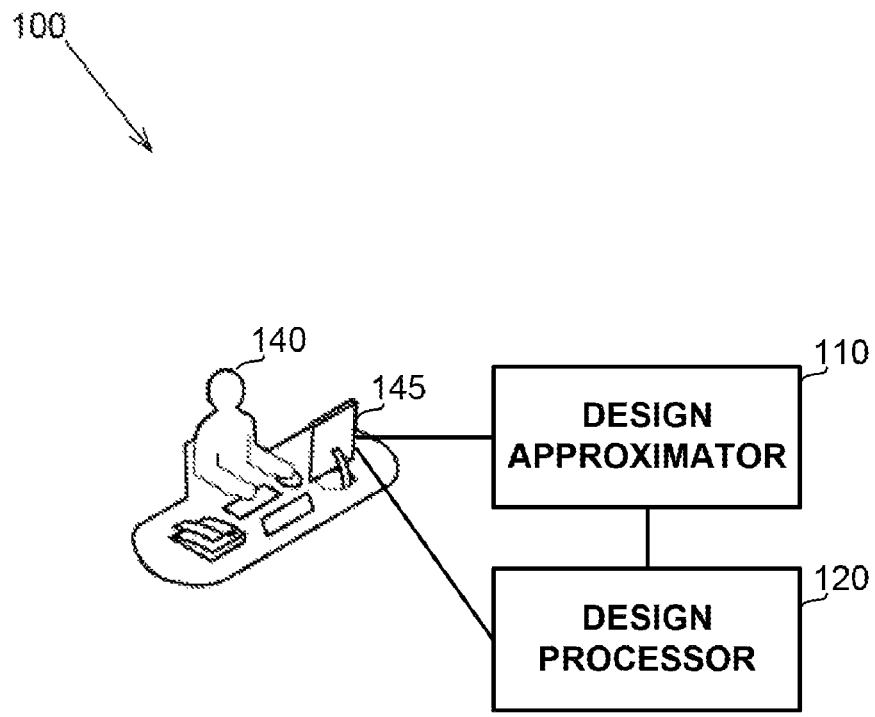
FIG. 1 shows a computerized environment in which the disclosed subject matter is used, in accordance with some exemplary embodiments of the subject matter.

The disclosed subject matter is described below with reference to flowchart illustrations and/or block diagrams of methods, apparatus (systems) and computer program products according to embodiments of the subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

One technical problem dealt with by the disclosed subject matter is to approximate a circuit design. Another technical problem is to determine an approximated circuit design useful for automatic or semi-automatic processing of the circuit design. Yet another technical problem is to determine clock gating function of a circuit design. Yet another technical problem is to perform processing on the circuit design such as logic optimization, false path analysis, or the like.

One technical solution is to approximate the circuit design by relaxing combinational logic that is not affected by signals of interest. Another technical solution is to identify cut-off points in the circuit design and to produce the approximated circuit design as the same circuit design aside from "cutting" the logic behind the cut-off points. "Cutting" the logic may be performed by replacing the combinational function representing the value at the cut-off point with a new input signal. Yet another technical solution is to traverse the connections of the circuit design, beginning from a predetermined connection towards the origin of the value of the connection, and identifying which connection is a potential cut-off and which is a non-cut-off point. The traversal may be performed until a combinational logic input signal is detected. A combinational logic input signal is a signal that is used as an input to determine a value of the connection in a cycle. For example, a combinational logic input signal may be an input signal to the circuit design. As another example, a combinational logic input signal may be an output signal of a memory element. A determination regarding a connection being a cut-off point may be with respect to a set of one or more combinational logic input signals. In some exemplary embodiments, the set of one or more combinational logic input signals may be selected online, may be predetermined, may be selected by a user, or the like. Yet another technical solution is to determine a combinational clock gating function of a memory element by determining cut-off points from the connection to the memory element (i.e., the signal setting the value of the memory element) with respect to the output signal of the memory element. The clock gating function may be applied on the circuit design. Yet another solution is to refine the determined clock gating function by introducing the combinational function that was removed during approximation of the circuit design.

One technical effect of utilizing the disclosed subject matter is to enable automatic and semi-automatic processing of the circuit design. By approximating the circuit design, the adverse effects of the state-space explosion problem may be reduced. Another technical effect is determining an exact clock gating function by processing the approximated circuit design. The clock gating function may be exact in the sense that in every cycle in which there is a clock gating opportunity, the function may provide a proper indication. Refining the clock gating function may be performed in order to simplify the clock gating function and determine constant value of the function or its sub-functions. Yet another technical effect is to provide a maximal cut-off point in the circuit design, so that if an additional connection in the approximated circuit design is disconnected and replaced with a new input signal, than an effect of the selected combinational logic input signal may be hidden.

Herein below, the disclosed subject matter is explained in particularity regarding computation of a clock gating function. However, the disclosed subject matter is not limited to this particular processing of a circuit design. Additional processes may be applied on the approximated circuit design, such as for example logic optimization, sensitivity analysis of the circuit design to a particular signal, false path analysis and similar processes applicable to the circuit design and/or verification.

Referring now to FIG. 1 showing a computerized environment in which the disclosed subject matter is used, in accordance with some exemplary embodiments of the subject matter.

A computerized environment 100 may comprise a design approximator 110. The design approximator 110 may be configured to obtain a circuit design, such as provided by a user 140. The circuit design may be provided in a descriptive language such as Hardware Description Language (HDL), Verilog, SystemC, or the like. The design approximator 110 may generate an approximated circuit design in accordance with the disclosed subject matter, A design processor 120 may be operative to process a circuit design. The design processor 120 may process the approximated circuit design for an improved feasibility and/or efficiency. The design processor 120 may perform a predetermined processing such as determination and addition of a Clock Gating (CG) function, optimization analysis, false path analysis and the like. In some exemplary embodiments, the design processor 120 may perform several processes. The design processor 120 may perform automatic or semi-automatic processing of the circuit design. In some exemplary embodiments, in response to processing the approximated circuit design, an additional processing, such as refining, may be performed prior to applying the output to the circuit design.

In some exemplary embodiments, the design approximator 110 and/or the design processor 120 may be computerized devices, implemented by software, hardware, firmware, combination thereof, or the like.

In some exemplary embodiments, a user 140 may utilize a Man Machine Interface (MMI) 145, such as a terminal, a display, a keyboard, an input device or the like. The user 140 may provide the circuit design, review the approximated circuit design, assist in semi-automatic processing performed by the design processor 120, review output of the design processor 120, or the like. The user 140 may select "interesting" combinational logic input signals that are not to be cut out of the approximated circuit design. The user may determine from which connection in the circuit design the cut-off points determination is performed.

Referring now to FIG. 2A showing a diagram of a circuit design, in accordance with some exemplary embodiments of the disclosed subject matter A circuit design 200 comprises a memory element 210, such as for example a flip-flop. The memory element 210 has an input connection 215 and an output signal 240. The value in the input connection 215, and therefore the value set in the memory element 210 in each cycle, originates from input signals 202 and from the output signal 240. The input signals 202 and the output signal 240 are considered combinational logic input signals. The value of input connection 215 is determined by AND gate 220, having two input connections 222 and 224. The value of connection 222 is determined by a combinational logic 205, which is based on some of the input signals. The value of the connection 224 is determined by an OR gate 230. The value of the OR gate 230 is based on the value in connections 232 and 234. The value of connection 234 is the value of the output signal 240. The value of connection 232 is determined by a combinational logic 207, which is based on input signals. In some exemplary embodiments, the combinational logics 205 and 207 may be based on the same input signals, different input signals, or a combination thereof. The combinational logics 205 and 207 may comprise combinational elements, such as AND gate, OR gate, XOR gate, Multiplexer, Arithmetic Logic Unit (LGU) or the like.

Referring now to FIG. 2B showing a diagram of an approximated circuit design, in accordance with the disclosed subject matter.

In some exemplary embodiments, the circuit design 200 may be approximated to circuit design 250. The approximation may be performed for the purpose of determining a combinatorial CG function for the memory element 210. For the purpose of determining the combinatorial CG function, CG opportunities are determined in case the value of connection 215 is the same as the combinational logic input signal in the output signal 240. Therefore, approximation may be performed starting from the connection 215 so that affects of the output signal 240 are propagated.

It will be noted that the values of connections 222 and 232 are determined by combinational logic which is not affected by the output signal 240. Therefore, the connections 222 and 232 may be considered as cut-off points in the circuit design 200. In the approximated circuit design 250, the value of the corresponding connections: 260 and 270 is determined using an input signal. In some exemplary embodiments, the potentially complex computations associated with the combinational logics 205, 207 is relaxed and abstracted to a simple input signal. Computation of the CG function based on the approximated circuit design 250 may be computationally easier.

In some exemplary embodiments, identification of the cut-off points may be performed by performing a Depth First Search (DFS) on the circuit design, starting from the connection 216. In some exemplary embodiments, the DFS may be performed on a DAG structure corresponding to the circuit design 200, so that a node is a connection having a value (e.g., the connection 215, the output signal 240, the input signals 202, and so forth).

Referring now to FIG. 2C showing a schematic depiction of corresponding DAG data structure of the circuit design 200, in accordance with some exemplary embodiments of the disclosed subject matter. Each node of the DAG is annotated with the corresponding connection number in the circuit design 200. The root is the connection 215. A node corresponding to a combinational logic input signal may be a leaf. A first node is a son of second node in case there is a direct connection from the first node to the second node, so that the value of the first node affects the value of the second node. For example, a node corresponding to connection 234 is a son node of the node corresponding to connection 224 (but not vice versa). In some exemplary embodiments, the connection 234 may be merged into the connection 240.

In some exemplary embodiments, the DFS may a post-order DFS so that leaves of the DAG are processed prior to their corresponding parent nodes. By iterating over the DAG, non-cut-off points and potential cut-off points may be marked. A leaf that is not one of the selected "interesting" combinational logic input signals (e.g., in this case any leaf other than 240) may be marked as a potential cut-off point. The "interesting" combinational logic input signals may be marked as non-cut-off points. A non-leaf node may be marked as a potential cut-off point in case all of its children nodes are potential cut-off nodes.

In this specific example node 222 and its children nodes may be marked as potential cut-off points. Node 232 and its children nodes may be too marked as potential cut-off nodes. Maximal cut may be determined by selecting two cut-off points: nodes 222 and 232. As an outcome of cutting in the selected cut-off points all additional potential cut-off points are also removed from the approximated circuit design.

In some exemplary embodiments, a different approximation may be performed. The approximation may be performed with respect to other/additional combinational logic input signals. The identification of the cut-off point may be performed from a different connection other than the 215 connection.

In some exemplary embodiments, a tree data structure, which is a private case of a DAG, may be used.

Figure 2D:
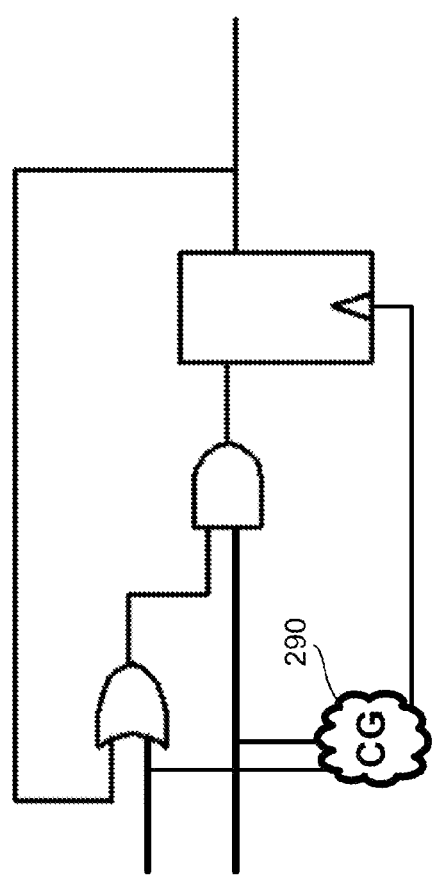
FIGS. 2D and 2E show corresponding diagram of the circuit design and the approximated circuit design to which a Clock Gating function is introduced, in accordance with some exemplary embodiments of the disclosed subject matter.
Figure 2E:
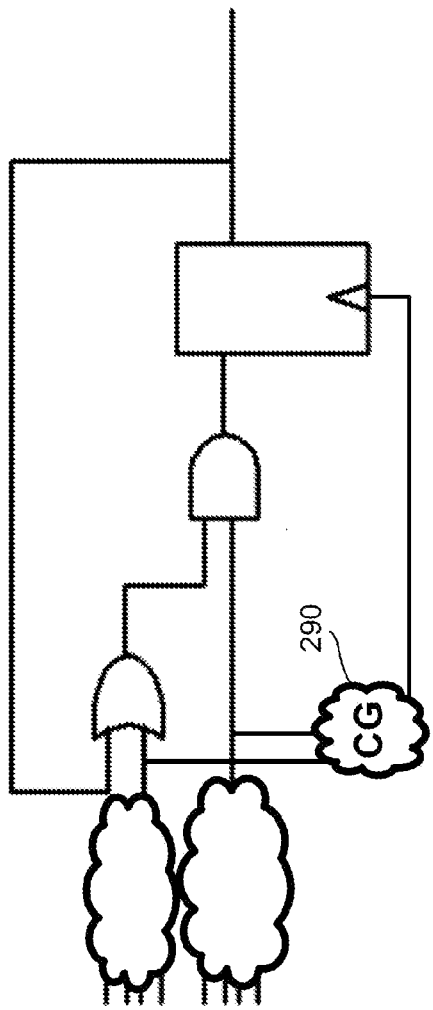

Referring now to FIGS. 2D and 2E showing corresponding diagram of the circuit design and the approximated circuit design to which a Clock Gating function is introduced, in accordance with some exemplary embodiments of the disclosed subject matter. A Clock Gating (CG) function may be determined based on the approximated circuit design, and a corresponding circuit portion 290 may be synthesized and introduced to the approximated circuit design (FIG. 2D). The circuit portion 290 may be utilized in the circuit design as well (FIG. 2E), by manipulating the wiring connections to the circuit portion 290. In some exemplary embodiments, the circuit portion 290 may be simplified in view of the constraints of combinational logic that was omitted in the approximated circuit design.

Figure 3:
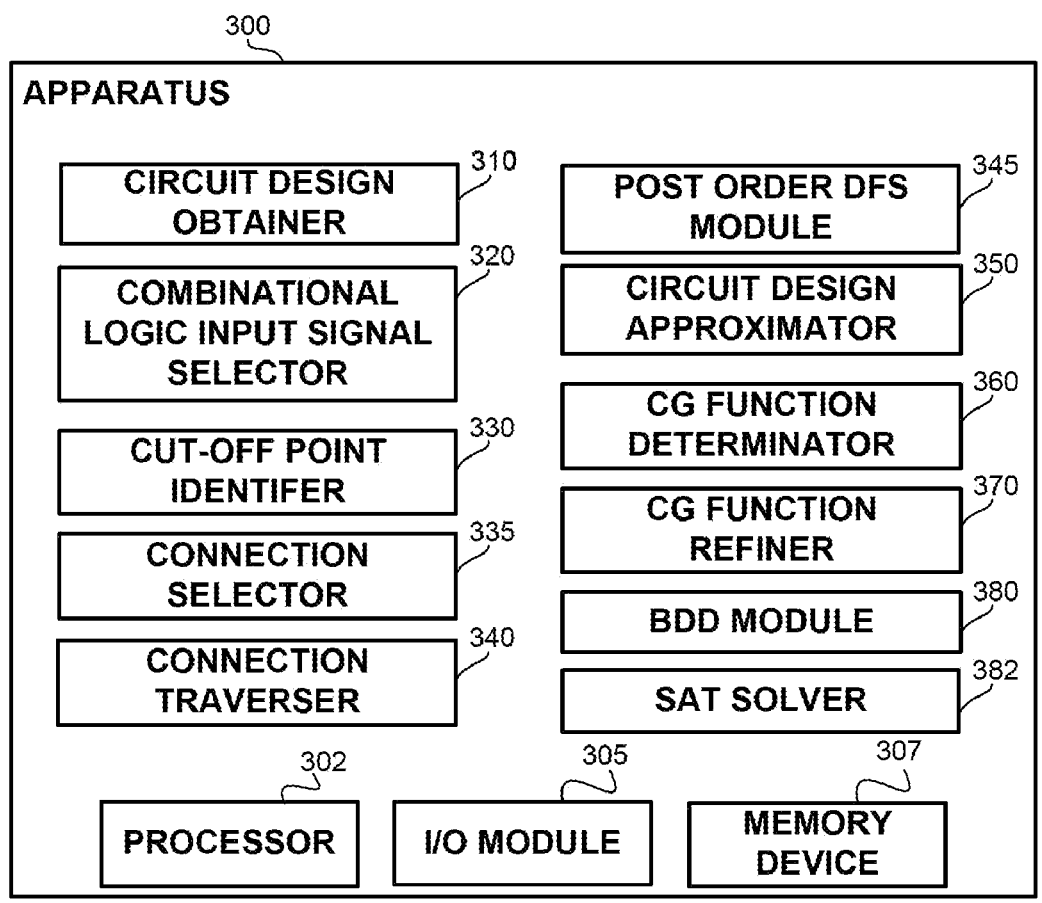
FIG. 3 shows a block diagram of an apparatus, in accordance with some exemplary embodiments of the disclosed subject matter.

Referring now to FIG. 3 showing a block diagram of an apparatus, in accordance with some exemplary embodiments of the disclosed subject matter.

In some exemplary embodiments, a circuit design obtainer 310 may be configured to obtain the circuit design. The circuit design may be obtain in an electronic form. The circuit design may be defined using a descriptive language such as HDL, Verilog, SystemC, or the like. The circuit design obtainer 310 may utilize the I/O module 305 to obtain the circuit design. The circuit design may be obtained from a user, such as 140 of FIG. 1, a file, a remote storage, or the like. In some exemplary embodiments, the circuit design may at least one memory element. In some exemplary embodiments, the circuit design may define connections between combinational elements, memory elements, and/or signal inputs.

In some exemplary embodiments, a combinational logic input signal selector 320 may be configured to select one or more combinational logic input signals of the circuit design. In some exemplary embodiments, approximation of the circuit design may be determined with respect to the selected one or more combinational logic input signals. The selection may be manual, automatic, or semi-automatic. The selection may be inputted by a user, such as 140 of FIG. 1, may be performed based on rules, commands or parameters, such as for example selection of an output signal of a memory element to which CG function is to be determined. In some exemplary embodiments, the selected combinational logic input signal may be 240 of FIG. 2A.

In some exemplary embodiments, a cut-off point identifier 330 may be operative to identify at least one cut-off point in the circuit design with respect to the selected combinational logic input signals. In some exemplary embodiments, a value of in a connection in the circuit design may be formulated as a combinational function of combinational logic input signals. The cut-off point may be characterized in having its value be determined by a combination function that does not comprise any of the selected combinational logic input signals.

In some exemplary embodiments, a connection selector 335 may be operative to select a connection of the circuit design. Identification performed by the cut-off point identifier 330 may be performed from the selected connection. The selection may be manual, automatic, or semi-automatic. The selection may be inputted by a user, such as 140 of FIG. 1, may be performed based on rules, commands or parameters, such as for example selection of an input connection to a memory element to which CG function is to be determined. In some exemplary embodiments, the selected combinational logic input signal may be 215 of FIG. 2A.

In some exemplary embodiments, a connection traverser 340 may be configured to traverse nodes of the circuit design. The connection traverser 340 may be utilized by the cut-off point identifier 330. The connection traverser 340 may traverse connections of the circuit design starting from a selected connection, such as selected by the connection selector 335, and downstream towards the combinational logic input signals. The connection traverser 340 may be configured to traverse a DAG data structure corresponding to the circuit design. The traversal may be performed until combinational logic input signals, such as input signals and/or output signals of memory elements are encountered.

In some exemplary embodiments, the connection traverser 340 may be configured to mark potential cut-off points and/or non-cut-off points during traversal. In some exemplary embodiments, a combinational logic input signal in the set of combinational logic input signals selected by the combinational logic input signal selector 320 is a non-cut-off point. Any other combinational logic input signal is a potential cut-off point. Any connection that is not a combinational logic input signal is a potential cut-off point if its value is determined based only on combinational logic input signals not in the set of combinational logic input signals selected by the selector 320. Using the marking, a determination may be made with regards to each connection by checking only its direct connections: in case any of them is a non-cut-off point, the connection is a non-cut-off point, and in case all of them are potential cut-off points, the connection is too a potential cut-off point.

In some exemplary embodiments, a post order DFS module 345 may be utilized by the connection traverser 340 to determine an order of traversal. The DFS module 345 may provide a traversal order of a post-order DFS.

In some exemplary embodiments, a circuit design approximator 350 may be configured to define an approximated circuit design, in accordance with the disclosed subject matter. The approximated circuit design may be the same as the circuit design except for "cutting" connections at the cut-off points and replacing them with fresh input signals. Such approximation may be viewed as modifying a combinational function defining the value of the connection with a value of an unconstrained input signal. For example, in case the cut-off point is defined by a connection to an AND gate which is connected to an input signal ($i_1$) and an OR gate that is connected to two input signals ($i_2$, $i_3$), then the value may be defined by the following combinational function: $i_1 \wedge (i_2 \vee i_3)$. In the approximated circuit design the value may be defined by a fresh and unconstrained input signal ($i'_1$).

In some exemplary embodiments, a CG function determinator 360 may be configured to determine a CG function with respect to a memory element of the approximated circuit design. The CG function may a combinatorial CG function, a sequential CG function, or the like. The CG function may be indicative of a cycle in which there is a CG opportunity in the approximated circuit design. The CG function may be applicable to the circuit design. A combinational logic may be synthesized based on the CG function. The synthesized combinational logic may be introduced to the circuit design. The input to the synthesized combinational logic may be the signals applicable to the CG function. In case the replacement input signal introduced at the cut-off point is used, a connection from the original combinational logic at the cut-off point may be used. Thereby, the CG function determined based on the approximated circuit design is used on the circuit design as is. In some exemplary embodiments, the CG function is an exact CG function. A CG function, determined using a predetermined algorithm on the approximated circuit design, may be said to be exact with respect to the predetermined algorithm, in case that no CG opportunity that would have been discovered by applying the predetermined algorithm on the circuit design is missed due to the predetermined algorithm being applied on the approximated circuit design. In other words, the exact CG function, derived from the approximated circuit design, may cover all CG opportunities (discoverable by the use of the predetermined algorithm) in the circuit design. In some exemplary embodiments, the exact CG function does not comprise CG opportunities that are incorrect when applied on the circuit design.

In some exemplary embodiments, some of the CG opportunities that are feasible in the approximated circuit design, may not be feasible in the circuit design, due to combinational logic relaxed in the approximated circuit design. In some exemplary embodiments, a CG function refiner 370 may be configured to refine the CG function by introducing the relaxed combinational logic into the CG function and simplifying the CG function. In some exemplary embodiments, after refinement, the CG function may be a constant (e.g., zero in case none of the CG opportunities are feasible), or may be simplified, such as to enable a more efficient combinational logic representation.

In some exemplary embodiments, a BDD module 380 may be operative to manipulate BDD variables. The BDD module 380 may be utilized by the CG function determinator 360 and/or CG function refiner 370.

In some exemplary embodiments, a fresh BDD variable for each combinational logic input signal of the approximated circuit design may be introduced. A BDD variable representative of the value of the connection selected by the connection selector 335 may be computed using the fresh BDD variables. A BDD of a CG function may be determined using any method known in the art. Each BDD variable in the BDD of the CG function that corresponds to a cut-off point may be replaced with a BDD variable representative of the relaxed combinational logic.

In some exemplary embodiments, a SAT solver 382 may be operative to manipulate SAT problems and provide a satisfying assignment to the SAT problem. The SAT solver 382 may be an all-SAT solver. Using the SAT solver 382, CG opportunities in the approximated circuit design may be determined. The SAT solver 382 may further be used to refine the CG function, such as verifying satisfiability when the relaxed combinational logic is re-introduced.

In some exemplary embodiments, the apparatus 300 may comprise a processor 302. The processor 302 may be a Central Processing Unit (CPU), a microprocessor, an electronic circuit, an Integrated Circuit (IC) or the like. The processor 302 may be utilized to perform computations required by the apparatus 300 or any of it subcomponents.

In some exemplary embodiments of the disclosed subject matter, the apparatus 300 may comprise an Input/Output (I/O) module 305. The I/O module 305 may be utilized to provide an output to and receive input from a user, such as 140 of FIG. 1.

In some exemplary embodiments, the apparatus 300 may comprise a storage device 307. The storage device 307 may be a hard disk drive, a Flash disk, a Random Access Memory (ROM), a memory chip, or the like. In some exemplary embodiments, the storage device 307 may retain program code operative to cause the processor 302 to perform acts associated with any of the subcomponents of the apparatus 300.

Figure 4:
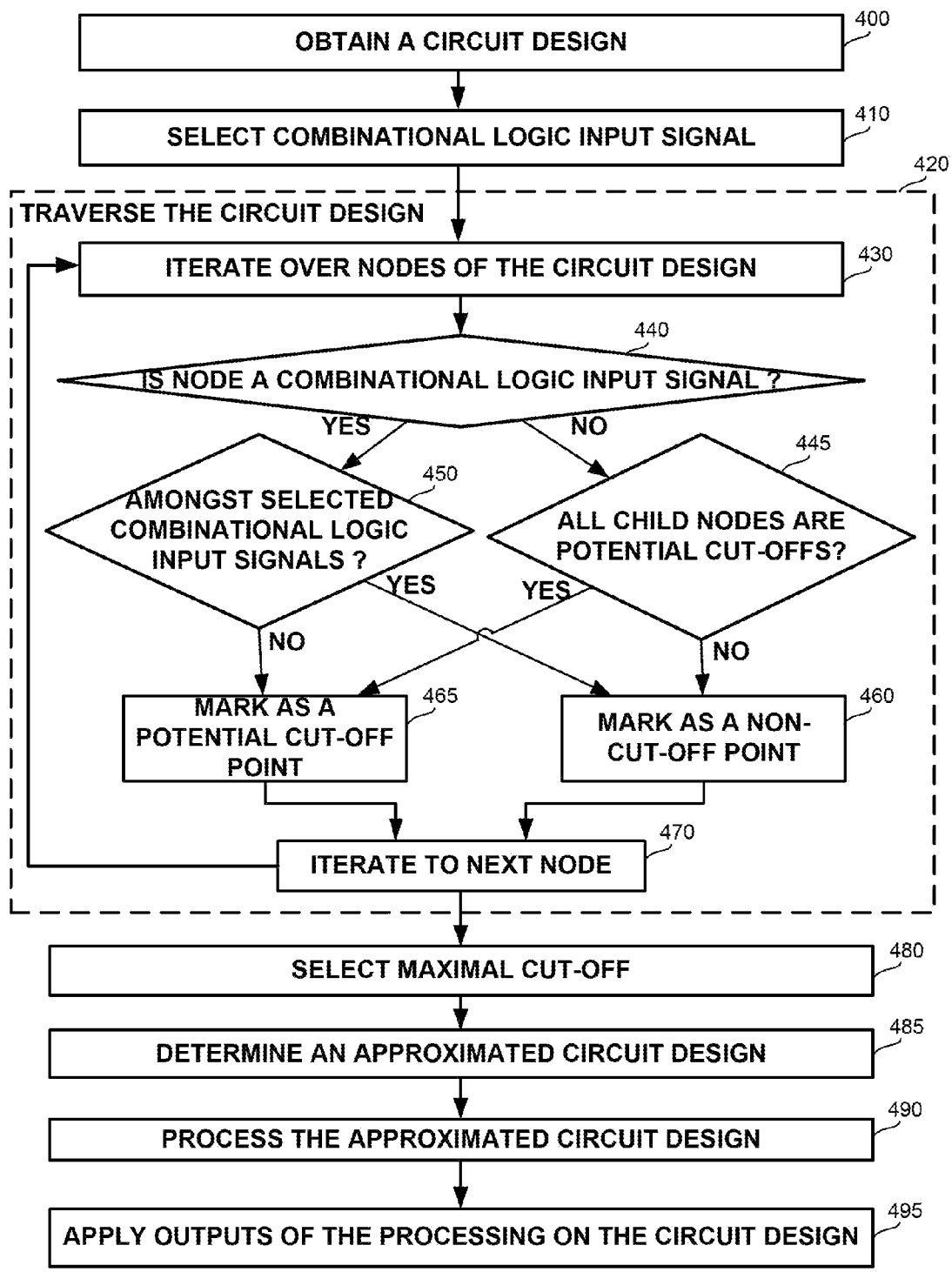
FIG. 4 shows a flowchart diagram of a method, in accordance with some exemplary embodiments of the disclosed subject matter.

Referring now to FIG. 4 showing a flowchart diagram of a method in accordance with some exemplary embodiments of the disclosed subject matter.

In step 400, a circuit design may be obtained. The circuit design may be obtained by a circuit design obtainer, such as 310 of FIG. 3.

In step 410, one or more combinational logic input signals may be selected. The combinational logic input signals may be selected by a combinational logic input signal selector, such as 320 of FIG. 3.

In step 420, a circuit design may be traversed. The circuit design may be traversed by a connection traverser, such as 340 of FIG. 3. Traversal order may be determined by a post-order DFS module, such as 345 of FIG. 3.

In step 430, iteration over nodes of the circuit design may commence. Iteration may be performed in respect to nodes of a DAG data structure corresponding to the circuit design.

In step 440, a determination whether a node is a combinational logic input signal may be performed. Combinational logic input signals (e.g., leaves of the DAG) may be processed in step 450. Other nodes may be processed in step 445.

In step 445, direct child nodes of the traversed node may be inspected to determine whether all nodes are potential cut-off points or not. Potential cut-off points may be nodes marked as potential cut-off points and/or combinational logic input signals that are not comprised by the set of combinational logic input signals selected in step 410.

In the case that the node corresponds to a combinational logic input signal (i.e., a leaf node in the DAG data structure), in step 450 a determination whether or not the combinational logic input signal is amongst the set of combinational logic input signals selected in step 410.

Based upon the determinations in steps 450 and/or 445, the node may be marked as either a potential cut-off point or as a non-cut-off point in steps 460, 465. Marking may be performed by retaining a data structure indicative of the marking. The marking may be performed using a Boolean variable.

In step 470, iteration to the next node, according to a determined order, such as a post-order DFS. In case there are no additional nodes to iterate over, step 480 may be performed.

In step 480, one or more cut-off points may be selected so as to provide a maximal cut-off in accordance with the disclosed subject matter. In some exemplary embodiments, a set of cut-off points provides a maximal cut-off in case that any additional constraint that may be relaxed by cutting it out of the circuit design is affected by at least one of the selected combinational logic input signals. In some exemplary embodiments, the cut-off points are selected as the highest level in the corresponding DAG representation of the circuit design. In case all the parent nodes of a potential cut-off node are also potential cut-off node, the potential cut-off node is not selected as a cut-off point, as its associated constraints may be relaxed by selecting its parents as cut-off points.

It will be noted that a maximal cut-off is a syntactic notion in the disclosed subject matter and not semantic. For example, XORing the value of a selected combinational logic input signal with itself may provide a constant zero value. Therefore, such a constraint may be simplified and an additional combinational logic may be potentially cut off the approximated circuit design. However, such a determination is a semantic determination. In some exemplary embodiments, additional processes, methods and/or algorithms may be applied to identify tautologies, constants and other semantic notions. After the circuit design is simplified the disclosed subject matter may be applied to provide for a syntactic maximal cut-off in the simplified circuit design.

In step 485, an approximated circuit design may be determined. The approximated circuit design may be synthesized based on the circuit design, where combinational logic leading to a cut-off point is omitted from the approximated circuit design and replaced with a new and unconstrained input signal. The approximated circuit design may be generated, synthesized, or otherwise determined by a circuit design approximator, such as 350 of FIG. 3.

In step 490, the approximated circuit design may be processed in a manual, semi-automatic, or automatic process. In some exemplary embodiments, the processing may be a determination of a CG function, such as performed by a CG function determinator, such as 360 of FIG. 3. Other processing that may be performed may include logic optimization, false path analysis and the like. Additional processing associated with circuit design and/or verification may be performed.

In step 495, an output of the processing of step 490 may be applied to the circuit design. In some exemplary embodiments, the CG function may be applied to the circuit design. In some exemplary embodiments, refinement, simplification, or similar operation may be performed prior to applying the output. For example, the CG function may be refined, such as by a CG function refiner 370 of FIG. 3.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of program code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method, the method comprising:

obtaining a circuit design, the circuit design is responsive to input signals, the circuit design defines connections between combinational elements, memory elements, and input signals;

selecting one or more combinational logic input signals of the circuit design;

identifying at least one cut-off point in the circuit design with respect to the selected combinational logic input signals, wherein said identifying is performed by using a computer, wherein value of the cut-off point is defined as a combinational function of a set of combinational logic input signals, the set of combinational logic input signals does not comprise any of the selected combinational logic input signals, wherein said identifying comprises identifying the at least one cut-off point from a selected connection of the circuit design wherein said identifying comprises traversing the connections of the circuit design to identify the at least one cut-off point, wherein said traversing begins in the selected connection, wherein said traversing stops at combinational logic input signals, wherein combinational logic input signals are input signals and output signals of memory elements; wherein said traversing comprises:

marking potential cut-off points, wherein a potential cut-off point is connected directly to an element selected from the group consisting of a combinational logic input signal not comprised by the selected combinational logic input signals and a potential cut-off point; and selecting from the potential cut-off points the at least one cut-off point; and approximating the circuit design by defining an approximated circuit design, wherein the approximated circuit design is retained in a storage device, wherein in the approximated circuit design the at least one cut-off point is defined as a value of a new input signal.

2. The computer-implemented method of claim 1, wherein said traversing comprises performing a post-order Depth First Search (DFS) stopping at combinational logic input signals, wherein during backtracking of said DFS, a connection of the circuit design is marked as a non-cut-off point in case the connection is connected to any of the selected combinational logic input signals.

3. The computer-implemented method of claim 1, wherein the circuit design comprises a memory element having an output signal;

wherein said selecting the one or more combinational logic input signals comprises selecting a memory element of the circuit design, and selecting an output signal of the memory element;

the computer-implemented method further comprises:

determining a clock gating function associated with the memory element in respect to the approximated circuit design; and wherein said approximating the circuit design is performed in respect to an input connection to the memory element.

4. The computer-implemented method of claim 3, further comprises: modifying the clock gating function by introducing combinational function removed from the approximated circuit design and simplifying the clock gating function.

5. The computer-implemented method of claim 3, wherein said determining the clock gating function comprises determining an exact clock gating function of the approximated circuit design; and whereby the clock gating function is an exact clock gating function of the circuit design.

6. The computer-implemented method of claim 1, further comprises:

performing an algorithm on the approximated circuit design and applying the results of the algorithm to the circuit design, wherein the algorithm is selected from the group consisting of determining a clock gating function, performing logic optimization and performing false path analysis.

7. A computerized apparatus having a processor and a memory device, the computerized system comprising:

a circuit design obtainer operative to obtain a circuit design, the circuit design is responsive to input signals, the circuit design defines connections between combinational elements, memory elements, and input signals;

a combinational logic input signal selector operative to select one or more combinational logic input signals of the circuit design;

a cut-off point identifier operative to identify at least one cut-off point in the circuit design with respect to the selected combinational logic input signals, wherein value of the cut-off point is defined as a combinational function of a set of combinational logic input signals, the set of combinational logic input signals does not comprise any of the selected combinational logic input signals wherein said cut-off point identifier is operatively coupled to a connection selector operative to select a connection of the circuit design, wherein said cut-off point identifier is configured to identify the at least one cut-off point from the selected connection, wherein said cut-off identifier is operatively coupled to a connection traverser operative to traverse connections of the circuit design starting from the selected connection;

wherein said connection traverser is operative to stop traversal at combinational logic input signals, wherein combinational logic input signals are input signals and output signals of memory elements;

wherein said connection traverser is further operative to mark potential cut-off points during traversal, wherein potential cut-off points are connections that are directly connected to an element selected from the group consisting of: a combinational logic input signal not comprised by the selected combinational logic input signals, and a potential cut-off point; and a circuit design approximator operative to define an approximated circuit design based on the circuit design, wherein in the approximated circuit design the at least one cut-off point is connected to a simple input signal instead of to the combinational function to the input signals.

8. The computerized apparatus of claim 7, wherein said connection traverser is operatively coupled to a post-order Depth First Search (DFS) module.

9. The computerized apparatus of claim 7, wherein said connection traverser is further operative to mark potential cut-off points during traversal, wherein potential cut-off points are connections that are directly connected to an element selected from the group consisting of: a combinational logic input signal not comprised by the selected combinational logic input signals, and a potential cut-off point.

10. The computerized apparatus of claim 7, further comprising a clock gating function determinator operative to determine a clock gating function in respect to a memory element of the approximated circuit design.

11. The computerized apparatus of claim 10, wherein said clock gating function determinator is configured to introduce the clock gating function to the circuit design.

12. The computerized apparatus of claim 10, wherein said clock gating function determinator is operatively coupled to a clock gating function refiner operative to modify the clock gating function by introducing combinational function removed from the approximated circuit design and to simplify the clock gating function.

13. The computerized apparatus of claim 12, wherein said clock gating function refiner is operatively coupled to a Binary Decision Datagram (BDD) module, wherein the clock gating function refiner is operative to replace a first BDD variable associated with the simple input with a second BDD variable associated with combinational function.

14. The computerized apparatus of claim 10, wherein said clock gating function determinator is operatively coupled to a Binary Decision Datagram (BDD) module.

15. The computerized apparatus of claim 10, wherein said clock gating function determinator is operatively coupled to a Boolean Satisfiability Problem (SAT) solver.

* * * * *